Jan. 23, 1951 J. A. ORSINO 2,539,318
STORAGE BATTERY CELL ASSEMBLING DEVICE
Filed May 13, 1946 5 Sheets-Sheet 1
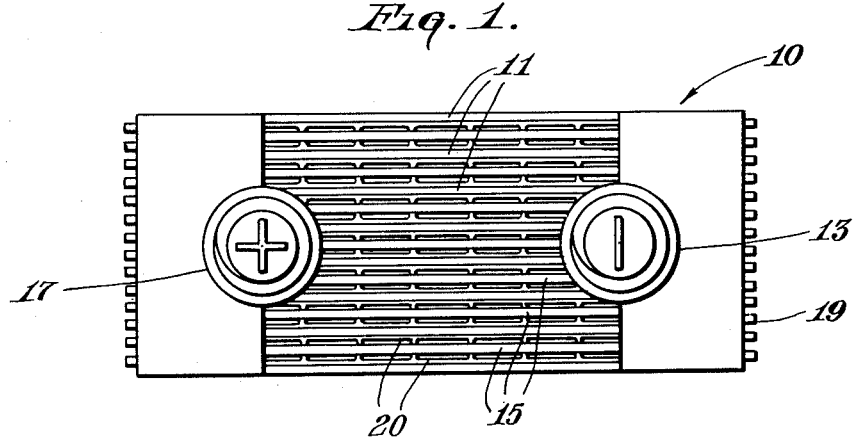
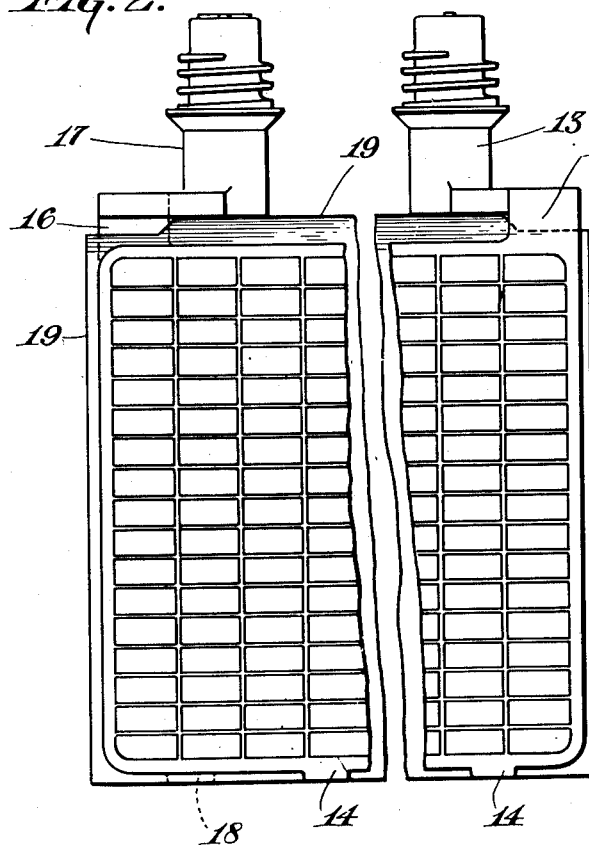
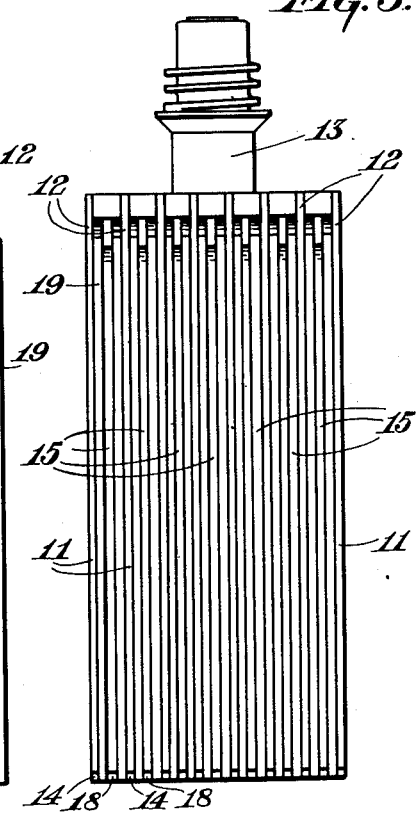
JOSEPH A. ORSINO
INVENTOR.
BY
Charles F. Kaegebehn
ATTORNEY.

Jan. 23, 1951 J. A. ORSINO 2,539,318
STORAGE BATTERY CELL ASSEMBLING DEVICE
Filed May 13, 1946 5 Sheets-Sheet 2
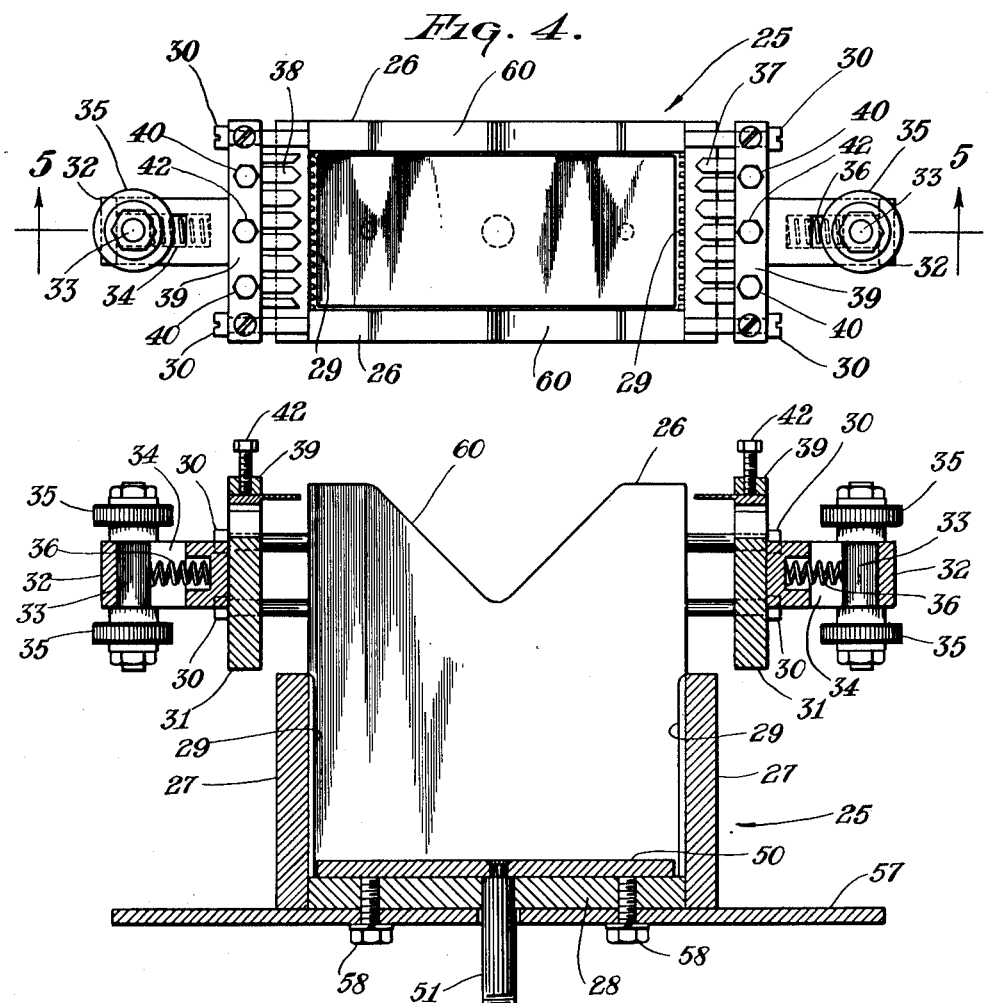
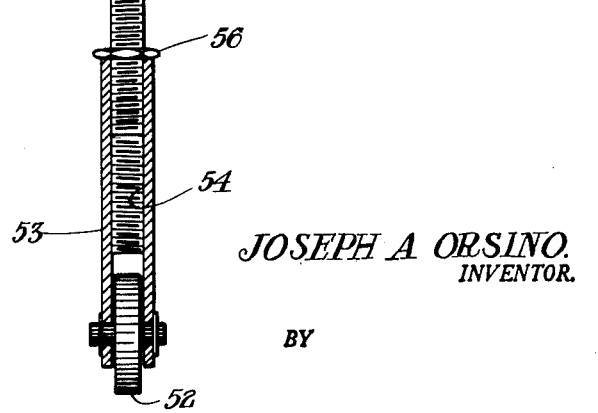
JOSEPH A. ORSINO.
INVENTOR.
BY
ATTORNEY Jan. 23, 1951        J. A. ORSINO        2,539,318
STORAGE BATTERY CELL ASSEMBLING DEVICE
Filed May 13, 1946        5 Sheets-Sheet 3
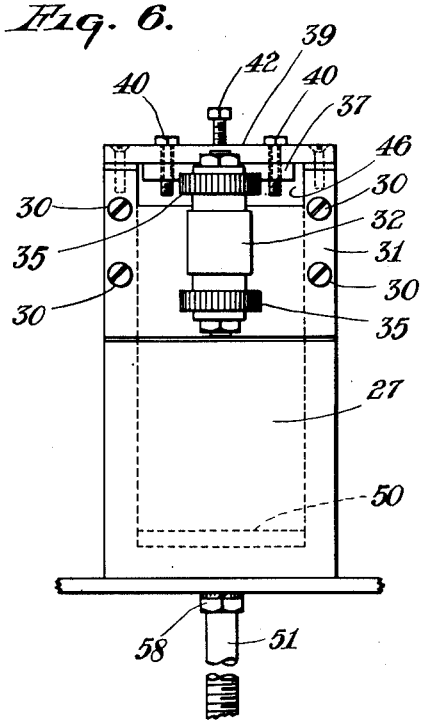
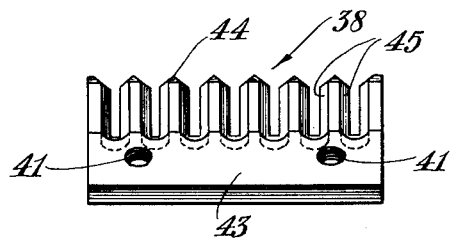
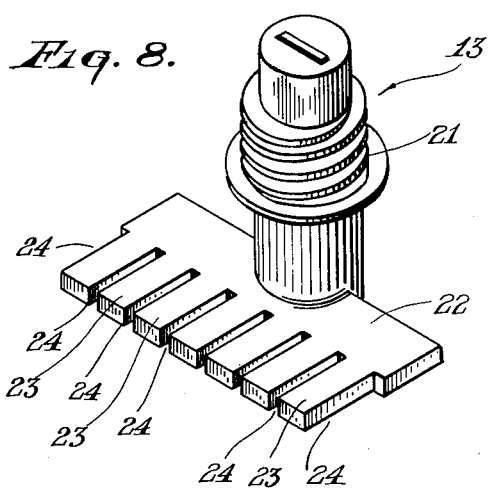
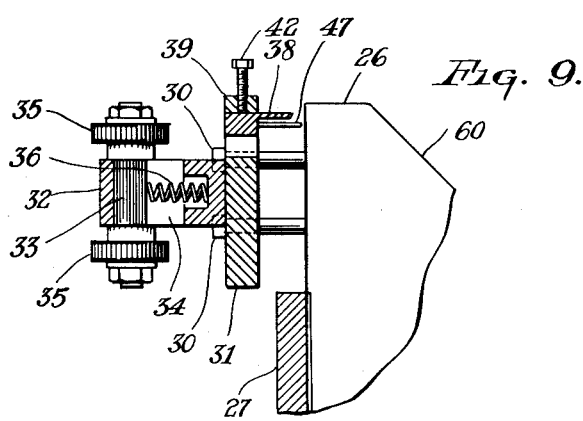
JOSEPH A. ORSINO.
INVENTOR.
BY
Charles F. Kaegebeh
ATTORNEY

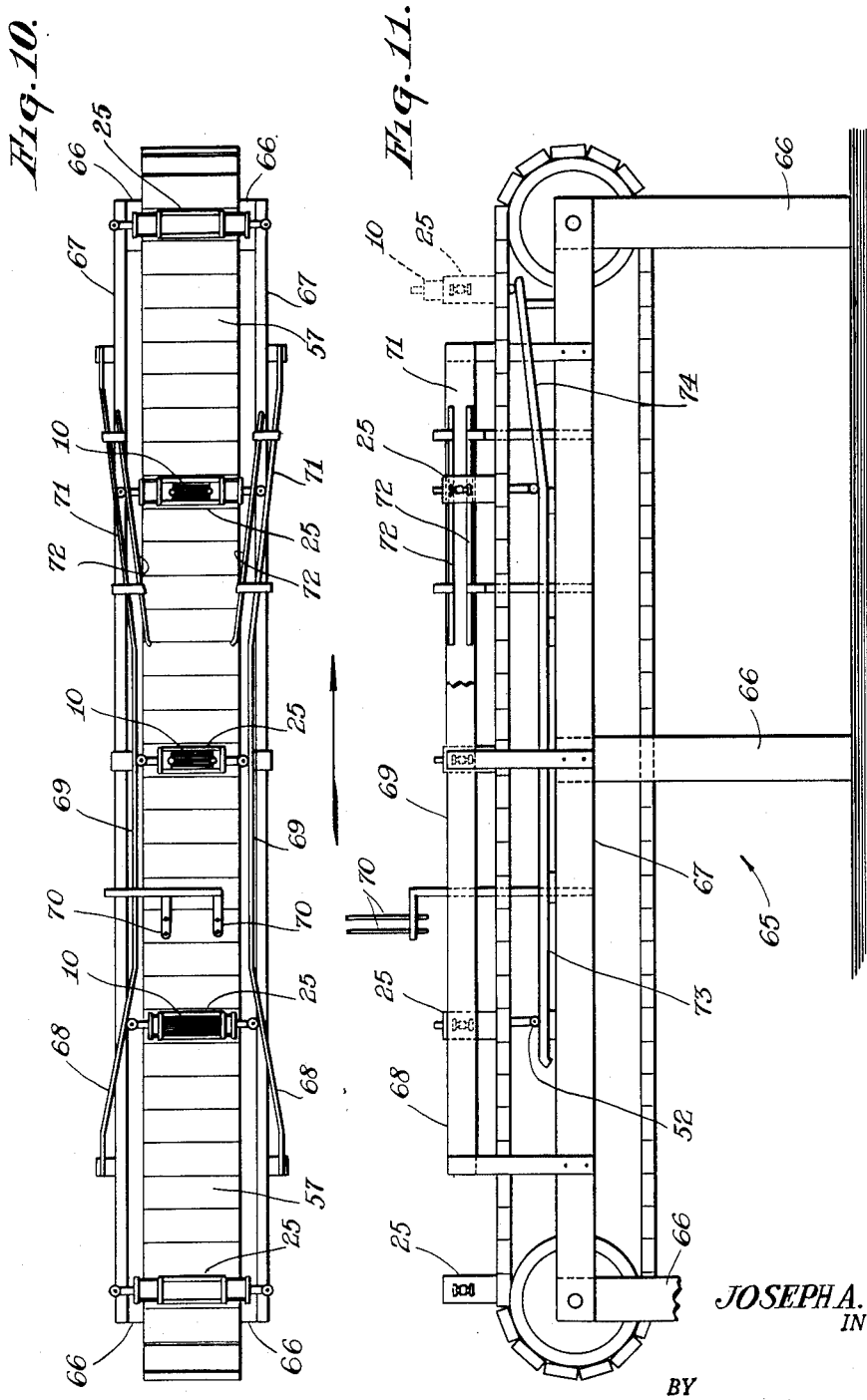

Jan. 23, 1951 J. A. ORSINO 2,539,318
STORAGE BATTERY CELL ASSEMBLING DEVICE
Filed May 13, 1946 5 Sheets-Sheet 5
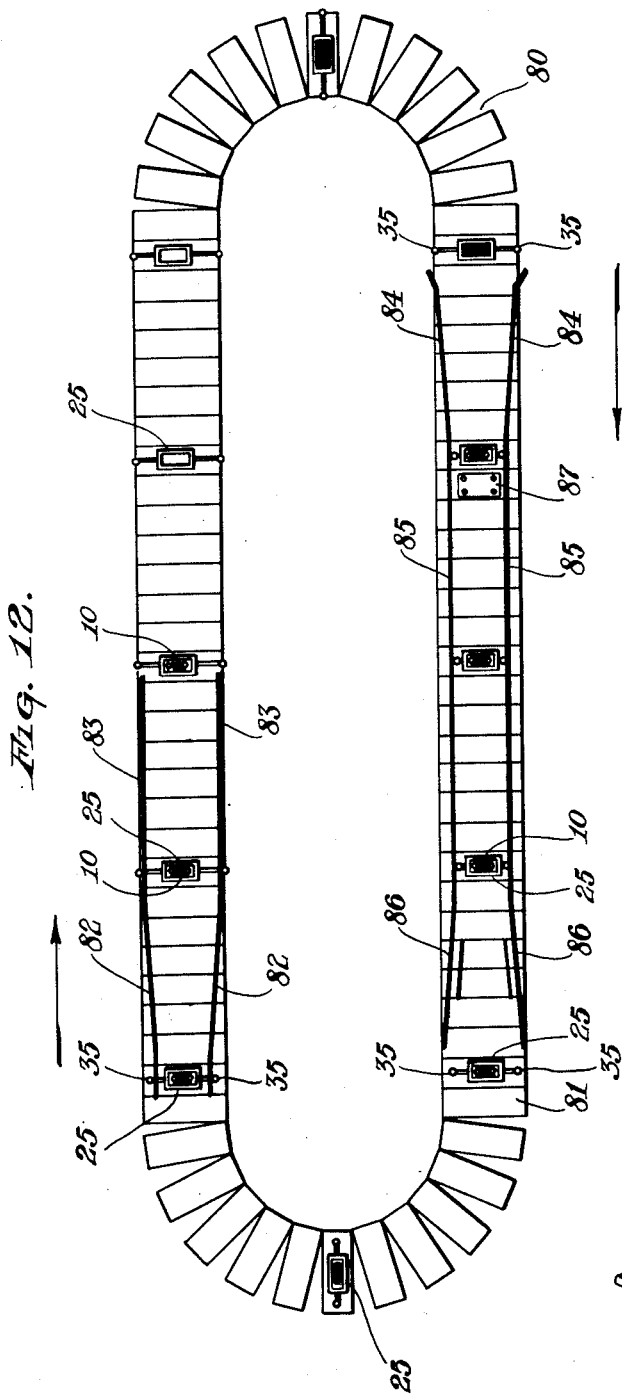
JOSEPH A. ORSINO.
INVENTOR.
BY
Charles F. Kaegebehl
ATTORNEY.

Patented Jan. 23, 1951

2,539,318

UNITED STATES PATENT OFFICE 2,539,318

STORAGE BATTERY CELL ASSEMBLING DEVICE

Joseph A. Orsino, Westfield, N. J.

Application May 13, 1946, Serial No. 669,232

1 Claim. (Cl. 113—59)

This invention relates to improvements in the method of assembling the component parts of storage batteries. More particularly, it relates to means for handling the components of a single storage battery cell whereby fixtures are provided to receive these component parts and to space automatically and hold such components in proper relationship to each other so that fusing of the common terminals for the groups of positive and negative plates may be readily accomplished by a continuous mechanical process requiring a minimum of manual handling of the parts.

Exclusive of the case and sulfuric acid electrolyte, the parts of the well-known lead plate storage battery cell consist of a plurality of positive and negative plates, insulating separators positioned between said plates, and terminals common to each group of positive and negative plates. The assembly of these parts into a unit cell has been accomplished in the past by operators who, through experience, have become skilled in the art of arranging positive and negative plates in alternative relationship with insulating separators between the plates and terminals connecting the respective positive and negative plate groups. The positive and negative plates are generally similar but differ slightly in thickness but not in the arrangement of the interior grid-like structure. Their overall size and outline are, however, identical and each positive and negative plate or grid is provided with an identical terminal portion, sometimes herein referred to as an "extension," so that when assembled in correct sequence, a group of negative plates, for instance, eight, is so arranged that another group of positive plates, one less in number, is nested between them with the terminal portions of each group in proper alignment at opposite sides of the cell group. The individual positive and negative plates are insulated from each other by the interposed, so-called "separators" which may be of semi-hard rubber, glass, wood or plastic. One side of the separator is smooth, the other provided with vertical ribs. In place, a separator is so positioned between a negative and a positive plate that the smooth surface of the separator is in contact with the surface of the negative plate while the ribs of its opposite surface contact the surface of the positive plate. Usually the separators are somewhat larger than the plates or grids and extend some slight distance beyond the plates at each end and at the top and bottom.

One of the disadvantages of the manual assembly of the unit cell just described, in addition to the large amount of hand labor required, is the difficulty encountered even by a skilled operator in attaining symmetrical alignment of the plates and separators. It has been found that unequal insulating areas exist at the end of the cell unit. Furthermore, an entire group of plates, either positive or negative, although uniformly assembled may shift in either direction between the separators and thus approach the opposite plate group at one end of the cell unit. It has also been found difficult to assemble the respective plate groups so that the terminal portions are in proper alignment to receive the terminals. Furthermore, during the manual assembly the plates are spread apart in order to accommodate the separators. Not infrequently, as a result of the spreading, the active material in the plates is broken loose and often the plates themselves are broken. In addition, the separators being of thin, friable material are easily cracked or broken which results in considerable waste if the cracks and splits are detected or in defective batteries, if they are not detected.

Accordingly, one object of the present invention is to provide a fixture into which the component parts of a single cell may be placed for proper mechanical and automatic alignment. Another object is to provide mechanical means for grouping the plates of a storage battery unit cell to receive the common terminals for the positive and negative plate groups. A still further object is to provide means whereby the fusing of the terminals to the positive and negative plate groups may take place in a continuous and uninterrupted mechanical process. Yet another object is to provide mechanical means for the operation of fixtures adapted to arrange the component parts of a single cell in proper spaced arrangement one to the other. A further object is to provide automatic means for partial ejection of a completed cell unit from the fixture in which it has been previously assembled. These and other objects will become apparent from the following description in which the invention is described with reference to the drawings comprising:

Fig. 1, a plan view of the components of a single storage battery cell unit in proper spaced arrangement;

Fig. 2, a partial broken front elevation of the cell shown in Fig. 1;

Fig. 3, an end view of the cell shown in Figs. 1 and 2;

Fig. 4, a plan view of an assembling and arranging fixture for the component parts of a single storage battery cell unit;

Fig. 5, a sectional elevational view of the drawing of Fig. 4 taken on the line 5—5 of Fig. 4;

Fig. 6, an end view of the fixture shown in Figs. 4 and 5;

Fig. 7, detail of the comb for positioning positive plates;

Fig. 8, detail of a terminal post for the negative plate group;

Fig. 9, a detail view of the end portion of the fixture for assembling the cell components;

Figs. 10 and 11, plan and elevation views of an endless belt conveyor system carrying a plurality of assembling fixtures for the continuous assembly of single storage battery cell units;

Fig. 12, a plan view of another form of an endless belt conveyor system for the same purpose.

Turning to the drawings, reference numeral 10 represents the assembly of a single storage battery cell unit provided, by way of illustration with eight negative plates 11 each having a terminal extension portion 12 for engaging the negative terminal post 13 and being provided at the bottom with supporting extensions 14. In the unit cell 10 shown in Figs. 1–3, there are seven positive plates 15 provided with terminal post extensions 16 for engaging the positive terminal post 17 and supporting extensions 18. The separators 19 are positioned in such manner between the negative plates 11 and the positive plates 15 that the smooth surfaces thereof are in contact with the negative plates while the ribs of the opposite surface are in contact with the positive plates providing spaces 20 on either side of each positive plate.

In the detail of a preferred form of negative terminal post 13 shown in Fig. 8, reference numeral 21 is the threaded end portion of the post; 22 is the base, or bus bar, portion thereof provided with projections 23 and slots 24 for cooperating with the extensions 12 of the negative plates 11 so that the said extensions 12 are received in the slots 24.

Reference numeral 25, Figs. 4–6 etc., represents a preferred form of fixture for assembling and arranging the component parts of the cell unit having side walls 26 with recesses 60 at the top to facilitate removal of an assembled cell unit, a stationary end wall portion 27 and a bottom 28. The stationary end wall portions 27, if desired, may be provided with vertical ribs 29 which cooperate with the component parts of the cell unit in such manner that the positive and negative plates abut against the ribs while the separators fit into the recesses between the ribs. Extending outwardly from the ends of the side walls 26 are guides 30 on which are movably mounted the slidable portions of the end walls 31 which are provided with extensions 32 carrying square bearing supports 33 slidably mounted in slots 34 in said extensions 32. Anti-friction bearings 35 are mounted on the upper and lower ends of the bearing supports 33 and these assemblies (bearings and supports) are held in normal operating position at the outer ends of the slots 34 by means of compression springs 36.

Mounted on the slidable end wall 31 at the negative end of the fixture 25 is a negative plate spacing comb 37 having seven pointed teeth providing six recesses between the teeth and a recess on each outer side of the two end teeth to receive the eight negative plates. Mounted on the slidable end wall portion 31 at the positive end of the fixture is a positive plate spacing comb 38 provided with six full pointed teeth and at each outer end with a half-tooth having between the full teeth and the half teeth seven recesses to receive the seven positive plates. It will be understood that the number of teeth in the negative and positive spacing combs will vary according to the number of positive and negative plates in the cell unit. The length of the teeth clearly shown in Figs. 7 and 9 are relatively short compared to the total width of the container and plates held therein. The tooth length is preferably approximately equal to the width of the extensions 12 which project upwardly from the positive and negative plates. These combs are held in place by supporting plates 39, provided with adjusting screws 40 which engaged tapped holes 41 in the base of the combs 43, as shown by the holes 41 in the base 43 of the comb 38 in Fig. 7, and locking screws 42. In Fig. 7 the pointed teeth 44 are chamfered on the bottom edge, as at 45.

In Fig. 9, an embodiment of a spacing comb assembly is shown in which the comb piece 38 is set in a cut out portion of the slidable side wall 31 to allow adjustment of the combs. Pins 47 are set in the base of the comb piece 38 directly beneath the teeth of the comb. These pins are positioned directly beneath the point of each full tooth so that, in operation, the pins on the positive comb piece cooperate on either side with the separators adjacent to the surfaces of the positive plates and from above with the negative plates to hold these components in proper alignment while the teeth of the comb fit between the positive plates just above the separators. Conversely, similar pins on the negative comb piece cooperate on either side with the separators adjacent to the surfaces of the negative plates and from above with the positive plates to hold these components in proper alignment while the teeth of the comb fit between the negative plates just above the separators.

According to the invention, the provision of the pins 47 is optional and, in many cases, in commercial practice, these may be omitted. Within the scope of the invention, the comb supporting plates 39 may be so designed, as by providing an inward extension fitting between the sidewalls 26, to form by cooperation with said sidewalls a well, or dam, for the molten lead which flows when terminal posts are fused with the plates. When the combs and supporting plates are in inward position and engaged with the battery plates and the base 22 of the terminal post is being fused in place, the extension 88 and adjacent portions of side walls 26 act to form a three-sided mold to confine the molten lead formed during the fusing operation.

In another preferred embodiment, the stationary end walls 27 extend to near the top of the sidewalls 26 and the slidable sidewall portions 31 are replaced by horizontally positioned plates of a thickness sufficient to permit them to be bored through transversely with bearing holes of a diameter such as to permit said plates to slide smoothly on the guides 30 which, if desired, may be mounted on external projections affixed to the sidewalls. This slidable plate should be of a width equivalent to the extension 32 of Fig. 5 and will carry the anti-friction bearings 35. This arrangement will eliminate any tendency of the sliding member to stick or bind. In this embodiment, the spacing comb pieces 37 and 38 are mounted on the slidable plates and are held from above by the comb supporting plates 39. It is a feature of the invention to design these supporting plates 39 to form, by abutment with the sides of sidewalls 26, solder-retaining wells or molds for the molten lead which fuses the terminal post bus bar portions to the plate extensions. Alternately, the supporting plates 39 may be shaped as with legs to form three sides of a rectangular solder-retaining well or mold for the molten lead. In this alternative, there is no cooperation with the sidewalls 26 which are shortened slightly to permit the legs of the supporting plates to ride above the tops of the side walls.

In the preferred embodiment of the assembling fixture 25 shown in the drawings, an ejector plate 50 is provided in the bottom of the fixture mounted on a shaft or rod 51 having a roller bearing 52 at its outer end. This roller bearing is carried on a bearing sleeve 53 threaded on the inside as at 54 to engage the threaded end 55 of the ejector plate rod 51 and being provided with a lock nut 56. This ejector assembly is another optional feature which in commercial practice need not always be provided.

In Fig. 5, reference numeral 57 represents a conveyor plate to which the assembly fixture is rigidly attached by fastening screws 58.

The operation and cooperation of the several parts constituting the apparatus of the present invention can be understood from the following description of the conveyor system 65 illustrated in Figs. 10 and 11.

The conveyor system 65 is supported by legs 66 and side members 67. The endless belt driven by means, for instance, an electric motor, not shown, 64 consists of a plurality of conveyor plates 57 hingedly joined together. On the conveyor plates 57 spaced at convenient intervals several assembly fixtures 25 are mounted around the said belt which in the drawing moves clockwise as indicated by the arrow. As an empty fixture 25 comes up in vertical position, the slidable end wall portions 31 are outwardly positioned on the guides 30. Into the receptacle formed by the sidewalls 26 and the stationary end wall portions 27, an operator places a set of cell components—negative plates, positive plates and separators—in proper alternative relation of negative plate, separator, positive plate, separator, negative plate and so on.

No special effort is made by the operator to achieve proper alignment of the components so long as they are in the correct relation. As the fixture travels along the conveyor, the anti-friction bearings 35 engage the closing guides 68 which because of their inward slope force the slidable end wall portions 31 inward. During the passage of the fixture, through these closing guides, the respective negative and positive combs 37 and 38 engage and align the negative and positive plates. As the fixture enters the guides 69 which maintain the slidable end wall portions 31 in closed position an operator fixes in place the positive and negative terminal posts which as the fixture passes under the gas burners 70 are fused to the respective negative and positive plate groups. As the fixture, now with positive and negative terminals fused in place, passes out of the guides 69, the anti-friction bearings 35 are engaged by the split guides 71 and 72 which cooperate to open the fixture by pulling the slidable end wall portions 31 outward thereby withdrawing the spacing combs 37 and 38 from engagement with the negative and positive plates so that ejector plate 50 may act to eject partially the cell unit from the fixture. The partial ejection of the cell unit is effected through the cooperation of the guide 73 having an upwardly inclined portion 74 and the roller bearing 52 in such manner that as the fixture passes along on the belt, the roller bearing 52 rides on the guide 73 and is thrust upwardly as it travels on the upwardly inclined portion 74 of said guide 73. The cell unit 10, now completely assembled with component parts in proper alignment and the terminal posts fused in place can be easily lifted out of the fixture which then travels around the underside of the conveyor system and is ready as it comes into upright position on the other side of the system to receive another group of roughly assembled cell components.

In Fig. 12, an alternative conveyor system 80 is illustrated which operates in the same horizontal plane. In this embodiment, the plates 81 are joined to and supported upon an endless chain. A cell unit group 10 is placed in the fixture 25 at the bend shown to right of Fig. 12 as it travels in a clockwise direction the guides 84 closed the fixture by engaging the anti-friction bearings 35. The fixture is held closed by the guides 85 while the positive and negative terminal posts are placed in position and burned or welded by the burners 87. The fixture is partially opened by the split guides 86 and the fixture then travels around the bend shown to the left of Fig. 12 to a position where guides 82 engage the anti-friction bearings 35 to complete opening of fixture and the assembled cell unit is removed as the fixture passes through the guides 83 or shortly after emerging therefrom. In the embodiment illustrated in this Fig. 12, the objects of the invention are achieved with ease equal to that accomplished in the embodiment illustrated in Figs. 10 and 11. It will be understood that other embodiments may be developed using well-known mechanical expedients without departing from the scope of the invention.

From the foregoing description, it will be seen that by means of the present invention, the component parts of a storage battery cell may be quickly and automatically aligned so as to receive the positive and negative terminals. The invention further provides means for fusing the said terminals in place in a continuous manner and, if desired, means for partially ejecting an assembled, completed cell unit from a fixture in which the assembling and alignment were effected.

I claim:

A device of the character described comprising a receptacle for holding storage battery plates in upright position, a plurality of parallel arms outwardly projecting from ends of the side walls of said receptacle, portions of the end walls of said receptacle horizontally slidably mounted on said arms, spacing combs having relatively short teeth mounted on said end wall portions, and inwardly projecting therefrom, extensions outwardly projecting from said end wall portions, said extensions having slots, rotatable bearings slidably mounted in said slots, springs mounted in said slots and urging said bearings towards the outer walls of said slots and means cooperating with said bearings for inserting the teeth of the combs between said plates for spacing the same for receiving terminal posts and thereafter for retracting said teeth therefrom.

JOSEPH A. ORSINO.

REFERENCES CITED

The following references are of record in the file of this patent:

UNITED STATES PATENTS

| Number | Name | Date |
|---|---|---|
| 379,321 | Moyer | Mar. 12, 1888 |
| 1,397,931 | Kurtz | Nov. 22, 1921 |
| 1,531,753 | Norris | Mar. 31, 1925 |
| 1,852,180 | McKnight | Apr. 5, 1932 |
| 1,932,136 | Hole | Oct. 24, 1933 |
| 1,960,195 | Nyce | May 22, 1934 |
| 2,430,188 | Sargent | Nov. 4, 1947 |